United States Patent [19]

Naarmann

[11] Patent Number: 4,566,955

[45] Date of Patent: Jan. 28, 1986

[54] PREPARATION OF FINELY DIVIDED ELECTRICALLY CONDUCTIVE PYRROLE POLYMERS

[75] Inventor: Herbert Naarmann, Wattenheim, Fed. Rep. of Germany

[73] Assignee: BASF Aktiengesellschaft, Fed. Rep. of Germany

[21] Appl. No.: 631,946

[22] Filed: Jul. 18, 1984

[30] Foreign Application Priority Data

Jul. 19, 1983 [DE] Fed. Rep. of Germany ....... 3325893

[51] Int. Cl.$^4$ ............................ C25D 9/02; H01B 1/12
[52] U.S. Cl. .................................... 204/59 R; 204/72; 204/78; 204/291; 252/500; 252/518
[58] Field of Search ................ 252/500, 518; 204/291, 204/59 R, 72, 78

[56] References Cited

U.S. PATENT DOCUMENTS 4,401,545 8/1983 Naarmann et al. ................ 252/500
4,468,291 8/1984 Naarmann et al. .................... 204/72

OTHER PUBLICATIONS

A. F. Diaz et al., J. Chem. Soc., Chem. Comm. (1979), p. 635.
K. C. Khulbe et al., J. Polym. Sci. 20, (1982), pp. 1089–1095.

Primary Examiner—Paul Lieberman
Assistant Examiner—Robert A. Wax
Attorney, Agent, or Firm—Keil & Weinkauf

[57] ABSTRACT

Finely divided electrically conductive pyrrole polymers are prepared by a process in which a finely divided pyrrole polymer, obtained by polymerization of pyrroles in solution with an oxygen-containing oxidizing agent, is electrochemically charged in the presence of a conductive salt. The finely divided electrically conductive pyrrole polymers can be used for the production of moldings.

2 Claims, No Drawings

PREPARATION OF FINELY DIVIDED ELECTRICALLY CONDUCTIVE PYRROLE POLYMERS

The present invention relates to a process for the preparation of finely divided, electrically conductive pyrrole polymers and to the use of these polymers for the production of moldings.

D. E. Weiss et al., Austr. J. Chem. (1963), pages 1056, 1076 and 1096, have disclosed that tetraiodopyrrole can be pyrolyzed, electrically conductive powders with high conductivities being formed. However, the preparation of such conductive powders is technically involved and uneconomical.

According to K. C. Khulke and R. S. Mann, J. Polym. Sci. 20 (1982), pages 1089–1095, pyrrole can be polymerized in aqueous solution in the presence of potassium persulfate so that the polymer separates out in the form of a finely divided black powder.

For many intended uses, for example for the production of electronic components, electrical switches, special electrode materials, etc., it is necessary or desirable to convert the electrically conductive, finely powdered pyrrole polymers to the desired form for use by means of a further processing step.

We have found that the properties of the finely divided pyrrole polymers available to date do not meet all requirements. In particular, the electrical conductivity is not sufficient.

It is an object of the present invention to provide finely divided electrically conductive pyrrole polymers which are more suitable for conversion to moldings.

We have found that this object is achieved by a simple process in which a finely divided pyrrole polymer, obtained by polymerization of compounds from the class consisting of the pyrroles, either alone or as a mixture with one another or with other compounds which are copolymerizable with pyrroles, in solution in the presence of an oxygen-containing oxidizing agent, is charged electrochemically in the presence of a conductive salt.

The present invention furthermore relates to the use of these finely divided pyrrole polymers for the production of moldings.

The finely divided pyrrole polymers according to the invention are highly electrically conductive systems with conductivities from $10^{-2}$ to 10, preferably from $10^{-1}$ to 5, in particular from 0 to 2.6, S/cm. The mean particle diameter can be from 0.05 to 5 mm, and the specific surface area is from 1 to 100 m$^2$/g. The novel finely divided pyrrole polymers may also be regarded as complexes of the ions and the polymeric pyrroles. The polymeric pyrroles of the invention possess good mechanical properties and in general have a balanced and improved spectrum of properties, in particular very good performance characteristics, which make them suitable for producing moldings.

The compounds from the class consisting of the pyrroles which can be used for the preparation of the novel polymers are pyrrole itself as well as substituted pyrroles, such as N-alkylpyrroles, N-arylpyrroles, pyrroles which are monoalkyl-substituted or dialkyl-substituted at the carbon atoms and pyrroles which are monohalogenated or dihalogenated at the carbon atoms. According to the invention, pyrrole can be used alone or as a mixture with other compounds from the class consisting of the pyrroles. Preferably, unsubstituted pyrrole itself is used. Where substituted pyrroles are employed, preferred compounds are the 3,4-dialkylpyrroles, in particular those where alkyl is of 1 to 4 carbon atoms, as well as the 3,4-dihalopyrroles, in particular 3,4-dichloropyrrole. Small amounts, eg. from 0.1 to 10 moles per mole of pyrrole, of other heterocyclic compounds which contain a conjugated $\pi$ electron system, eg. furan, thiophene or thiazole, may also be present.

To prepare the finely divided pyrrole polymers, the compounds from the class consisting of the pyrroles are treated in solution with an oxygen-containing oxidizing agent. Advantageously, from 0.2 to 10 moles of the oxidizing agent are used per mole of pyrrole or of a mixture of pyrroles with one another or with other compounds which are copolymerizable with pyrroles. If less than 1 mole is used, it is found that some of the starting material employed is not converted to polymer. It is not necessary to use larger amounts of oxidizing agents, since the stated amount is sufficient to convert the total amount of starting materials to polymer.

An excess over and above the stated amount is not necessary in most cases but may sometimes produce particular effects. Among the oxygen-containing oxidizing agents, peroxo acids and their salts and peroxodisulfuric acid and its alkali metal and ammonium salts have proven particularly useful. Peroxoborates or peroxochromates, such as sodium perborate or potassium bichromate, are also preferably used. Permanganates, eg. potassium permanganate, are also suitable if they are mixed with small amounts of acids. The use of hydrogen peroxide is also preferred, but when it is used a conductive salt must be present.

The finely divided pyrrole polymers are prepared in solution, and water has proven useful as a solvent, if necessary mixed with an organic water-miscible solvent. However, it is also possible to use organic solvents, such as dimethyl sulfoxide, methylene chloride, methanol, ethanol, acetonitrile, sulfolane, ethylene carbonate, propylene carbonate, dioxane or tetrahydrofuran. Where an organic water-immiscible solvent is used, it has proven useful to incorporate small amounts of water as a fine dispersion in the organic solvent. Preferably, however, the finely divided pyrroles are prepared using water. In an advantageous procedure, the solution contains from 0.1 to 50, preferably from 1 to 5, % by weight of the pyrrole or of the mixture of pyrroles, with or without other compounds. The amount of oxidizing agent added is in accordance with the principle stated above. The reaction can advantageously be carried out at from G to 100° C., preferably from 15° to 40° C., but satisfactory results are generally obtained when it is carried out at room temperature. The finely divided pyrrole polymers obtained are then charged electrochemically in the presence of a conductive salt, for which purpose this salt is dissolved in an electrolyte. Particularly suitable electrolytes are non-aqueous ones, such as acetonitrile, sulfolane, glacial acetic acid, dimethylformamide, propylene carbonate, tetrahydrofuran, dioxane or methyl chloride. The conductive salt or acid is used in an amount of from 0.1 to 4.5 parts by weight per part by weight of polypyrrole.

The conductive salts added to the solutions are also referred to as complexing agents or doping agents.

Examples of conductive salts which have proven useful are $KHSO_4$, $Na_2SO_4$, $HCOOH$, $LiClO_4$, $HClO_4$, $NEt_4ClO_4$, $NBu_4ClO_4$, $KAlF_3$, $NaAlF_6$, $KBF_4$, $K_2TiF_6$, $K_2ZrF_6$, $K_2NiF_4$, $HO_2(NO_3)_2$, $H_2SO_4$, $FeCl_3$, $NOPF_6$, $KAsF_6$ or $NaPF_6$. The concentration of the conductive salt is such that not less than 1 mole of one of the conductive salts listed above is used per 3 moles of the pyrrole employed or the other monomers.

Electrochemical charging is carried out as follows: as described in the Examples (eg. Example 2), the salt is added to the polypyrrole powder and the mixture is placed in a trough-shaped electrode, which is then made the anode. The electrolyte system is non-aqueous and consists, of, for example, acetonitrile, with tributylammonium benzenesulfonate as a conductive salt.

The process is carried out at a current density of from 0.01 to 10 mA/cm$^2$, a voltage of from 0.1 to 100 V advantageously being chosen. The charging time is in general from 0.1 to 30 hours. The novel finely divided electrically conductive pyrrole polymers, which may also be referred to as finely pulverulent pyrrole polymers, have very good performance characteristics and are particularly useful for the production of moldings.

These moldings can be used as, for example, electrodes, catalysts, diaphragms, electrical storage systems, batteries, switches, semiconductor components, shielding materials and solar cells. In finely divided form, the novel pyrrole polymers can be used for the antistatic treatment of plastics.

The moldings can be produced using a conventional method in which the polymer is compressed under superatmospheric pressure and at elevated temperatures. As can be seen from the prior, previously unpublished patent application, it has, for example, proven useful to carry out the procedure at from 150° to 300° C. and under not less than 50, preferably from 100 to 200, bar. If it is desired to modify the properties, it is sometimes advantageous to produce moldings by processing the novel finely divided pyrrole polymers together with other nonconductive thermoplastics. Moldings can also be produced by combining the finely divided pyrrole polymers with products having a higher conductivity. The Examples which follow illustrate the invention. Parts and percentages are by weight.

EXAMPLE 1

Preparation of the finely divided polypyrrole

An aqueous solution of $K_2S_2O_8$ is added slowly to a vigorously stirred solution of 2 parts of pyrrole in 100 parts of water in a stirred flask at room temperature. The molar ratio of pyrrole to $K_2S_2O_8$ is 6:1. After a short time, a black precipitate separates out. After a reaction time of 15 minutes, this precipitate is filtered off, washed neutral with water, washed with methanol and then dried for 8 hours under 0.5 mmHg and at 50° C.

The finely pulverulent material and a mean particle diameter of 0.2 μm and a specific surface area of 15 m$^2$/g.

This material is pressed to give a tablet, the conductivity of which is measured as 0.1 S/cm.

The same amount of pyrrole together with the same amount of $K_2S_2O_8$ is treated at room temperature in a mixture of 1 part of water and 1 part of methanol. The same results as above are obtained.

EXAMPLE 2

Electrochemical charging of finely divided polypyrroles

In a flow-through electrolysis cell, 1 part by weight of the finely divided polypyrrole obtained as described in Example 1 is applied onto a trough-like platinum electrode, which is made the anode. 370 parts by weight of acetonitrile containing 1.5 parts of dissolved tributylammonium benzenesulfonate are introduced into the cell so that the solution flows over the anode and the polypyrrole. The voltage applied is 20 volts and the current density 5 mA/cm$^2$, and charging is carried out for 30 minutes. The powder is isolated, washed with methanol and dried.

The conductivity of the powder is 5.4 S/cm.

EXAMPLE 3

The procedure described in Example 2 is followed and the polypyrrole is treated as described in the Table below. In this way, the polypyrroles obtained have different conductivities which are substantially higher in each case.

TABLE

| No. | Electrolyte Type and amount | Conductive salt (acid) Type and amount | Current density mA/cm$^2$ | Time min. | Conductivity g/cm |
|---|---|---|---|---|---|
| 3 | acetonitrile 370 | 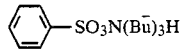—SO$_3$N(Bu)$_3$H | 10 | 30 | 6.2 |
| 4 | " | 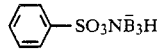—SO$_3$NB$_3$H | 2 | 60 | 5.1 |
| 5 | " | " | 1 | 90 | 5.3 |
| 6 | " | " | 0.1 | 360 | 5.0 |
| 7 | propylene carbonate 370 | LiClO$_4$ | 5 | 36 | 8.2 |
| 8 | " | NBu$_4$ClO$_4$ | 5 | 36 | 6.5 |
| 9 | " | K$_2$TiF$_6$ | 5 | 36 | 7.2 |
| 10 | " | K$_2$NiF$_4$ | 5 | 36 | 7.3 |
| 11 | " | Na$_3$AlF$_6$ | 5 | 36 | 5.8 |
| 12 | methylene chloride 370 | HClO$_4$ | 0.1 | 1200 | 7.2 |
| 13 | glacial acetic acid 370 | NOPF$_6$ | 1 | 90 | 5.9 |

I claim:
1. A process for preparing a finely-divided electrically conductive pyrrole polymer comprising the following sequential steps:
(A) carrying out a solution polymerization of an unsubstituted or substituted pyrrole monomer taken either alone or in an admixture with one another in the presence of from about 0.2 to 10 moles of an oxygen-containing oxidizing agent per mole of pyrrole monomer to produce a finely-divided pyrrole polymer, and
(B) effecting an electrochemical charging of said pyrrole polymer in a non-aqueous electrolyte sys- tem in the presence of a conductive salt, with said electrochemical charging being conducted at a current density of from 0.01 to 10 mA/cm², a voltage of from 0.1 to 100 V, and over a time period of from about 0.1 to 30 hours.

2. A process as claimed in claim 1, wherein the finely divided pyrrole polymer is electrochemically charged in the presence of a non-aqueous electrolyte.

* * * * *